United States Patent [19]

Nissley, Jr.

[11] 4,014,246
[45] Mar. 29, 1977

[54] ROCKET-POWERED APPARATUS FOR LAUNCHING A FLYING DEVICE

[75] Inventor: William J. Nissley, Jr., Wilmington, Del.

[73] Assignee: All American Industries, Inc., Wilmington, Del.

[22] Filed: July 2, 1975

[21] Appl. No.: 592,394

[52] U.S. Cl. .............................. 89/1.819; 244/63
[51] Int. Cl.² .................................. F41F 7/02
[58] Field of Search ............ 89/1.819; 244/63, 110

[56] References Cited

UNITED STATES PATENTS

| 2,083,805 | 6/1937 | Adams | 244/63 |
| 2,717,744 | 9/1955 | Birnbaum | 244/63 |
| 2,734,702 | 2/1956 | Northrop et al. | 89/1.819 X |
| 2,843,343 | 7/1958 | Ward | 244/63 |

FOREIGN PATENTS OR APPLICATIONS 1,007,644   2/1952   France ........................... 244/63

OTHER PUBLICATIONS

Handbook entitled: "POHWARD Aircraft Rocket Engine Handbook", pub. May 28, 1967.

*Primary Examiner*—David H. Brown
*Attorney, Agent, or Firm*—Connolly and Hutz

[57] ABSTRACT

A rocket-powered vehicle is held latched at the starting end of its guide track while a high steam pressure is built up within the rocket casings through probes inserted into the nozzles which also seal them. When the latch is released, the rockets move off the probes to unblock the nozzles whereby the rockets propel the vehicle down the track to launch the flying device.

7 Claims, 7 Drawing Figures

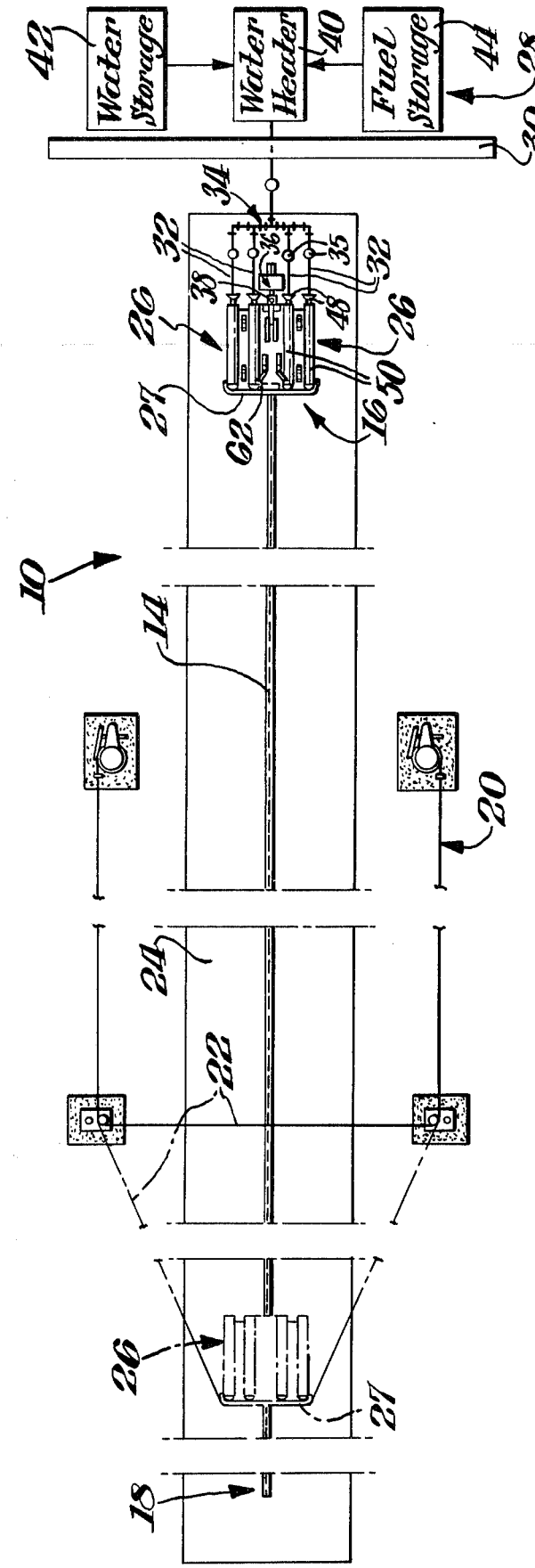
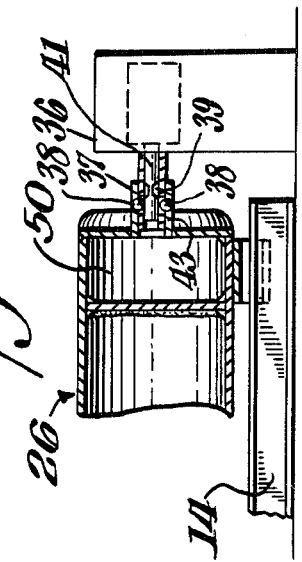

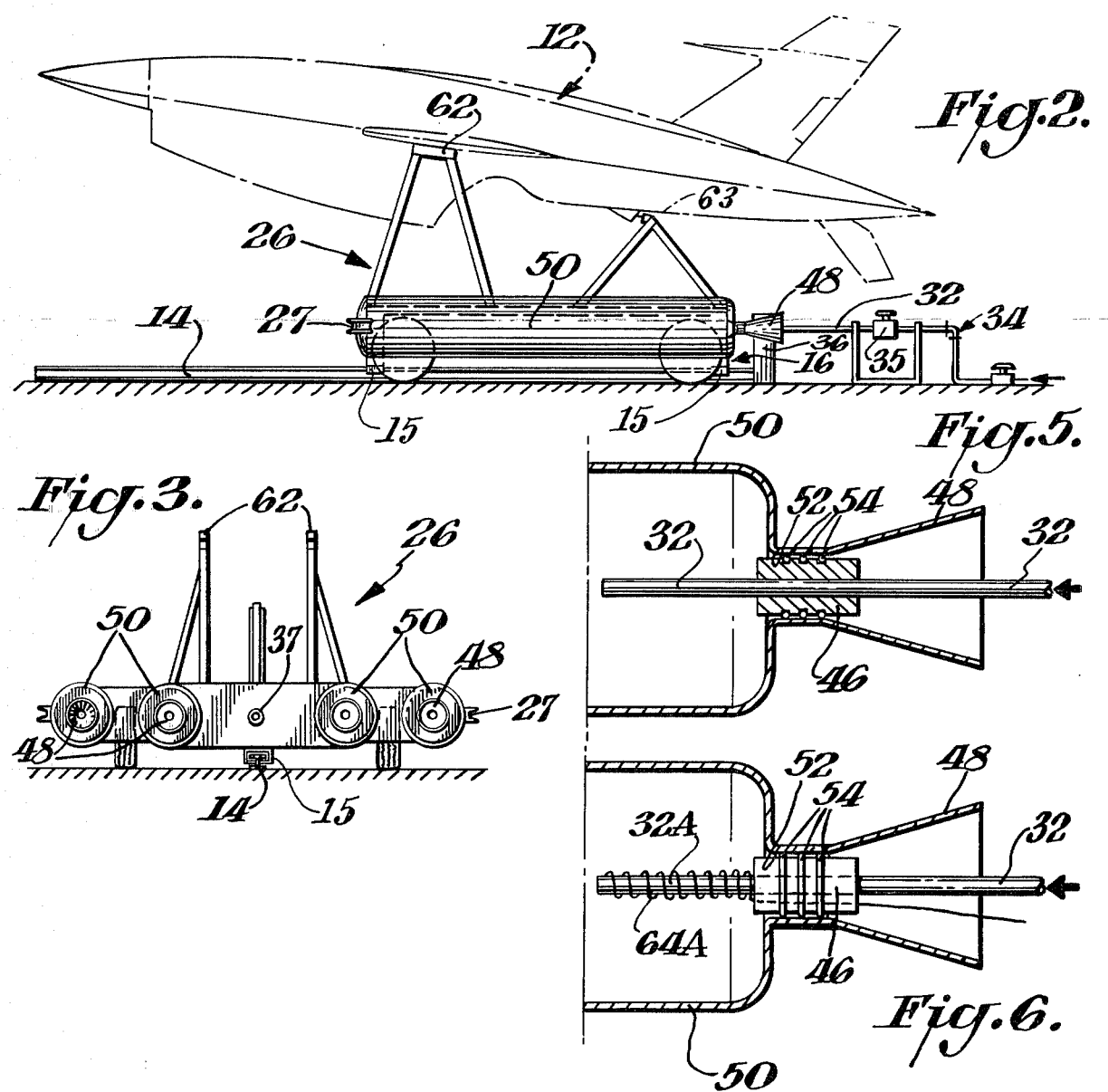
Fig. 2.
Fig. 3.
Fig. 5.
Fig. 6.
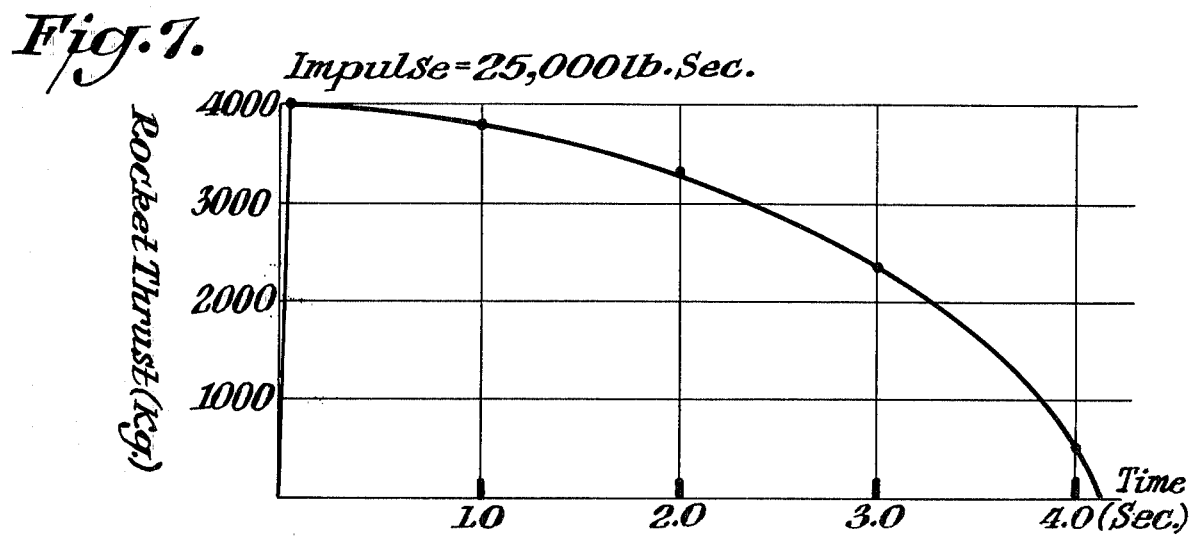
Fig. 7.
Impulse = 25,000 lb.Sec.
Rocket Thrust (Kg.)
Time (Sec.)

4,014,246

ROCKET-POWERED APPARATUS FOR LAUNCHING A FLYING DEVICE

BACKGROUND OF THE INVENTION

Launching apparatus for flying devices are complicated by the need to store considerable quantities of energy, either kinetic or pressure. Rockets have been proposed for simplifying such launching apparatus. Steam-powered rockets are particularly advantageous but their operating valves are fairly complicated. An object of this invention is to provide a relatively simple and economical rechargeable rocket-powered apparatus for launching a flying device.

SUMMARY

In accordance with this invention, a rocket-powered vehicle is connected to a guide track having an arrested device at its terminal end. The vehicle is latched at the starting end while pressurized fluid is inserted into the rocket casing through loading probes connected to a source of pressurized fluid, such as superheated water. The nozzle is blocked during pressurizing by seals between the base of the probe and nozzle. When the latch is released, the rocket moves away from the probe to unblock the nozzle whereby the pressurized fluid freely exhausts through the nozzle to propel the vehicle and attached flying device down the track where the vehicle is arrested and the flying device is propelled forward into the air.

BRIEF DESCRIPTION OF THE DRAWING

Novel features and advantages of the present invention in addition to those mentioned above will become apparent to one skilled in the art from a reading of the following detailed description in conjunction with the accompanying drawings wherein similar reference characters refer to similar parts and in which:

FIG. 1 is a schematic plan view of one embodiment of this invention;

FIG. 2 is a side view in elevation of a flying device mounted on a vehicle portion of the embodiment shown in FIG. 1;

FIG. 3 is a rear view of the vehicle portion shown in FIG. 2 without a flying device on it;

FIG. 4 is a fragmental cross-sectional view illustrating the vehicle latching device;

FIG. 5 is a view in elevation partially in cross section of the loading probe and nozzle of the embodiment shown in FIGS. 1–3;

FIG. 6 is a schematic view in elevation partially in cross section of a modification of the loading probe shown in FIG. 5; and FIG. 7 is a theoretical curve of Thrust vs. Time for one of the rockets employed in the embodiment of this invention shown in FIGS. 1–5.

DESCRIPTION OF THE PREFERRED EMBODIMENTS

In FIG. 1 is shown a rocket-powered launching apparatus 10 for a flying device such as a remotely piloted vehicle or aircraft 12 (shown in FIG. 2). Apparatus 10 includes a guide track 14 having starting end 16 and a terminal end 18. Arresting system 20, such as described in U.S. Pat. No. 3,172,625, is mounted adjacent terminal end 18 with its pendant 22 across runway 24 for smoothly arresting the movement of rocket-powered vehicle 26 at grooved bumper 27 in a similar manner as arresting device 20, is normally used for arresting the motion of landing aircraft. A source of pressurized fluid 28, such as a super-heated hot water generating system, is mounted behind wall 30 at the starting end 16 of track 14. Source 28 includes a bank of pressurized fluid loading conduits or probes 32 connected to source 28 by a manifolded and valved distributing piping system 34. Latch 36 restrains vehicle 26 from movement while it is being charged with pressurized fluid at starting end 16. As shown in FIG. 4, latch 36 is for example, an electric solenoid-operated ball lock that is received in latch cylinder 37 in which locking balls 38 are engaged in or released from detent holes 43 in latch cylinder 37 by moving groove 39 on internal shaft 41 in line and out of line with the balls.

Source of pressurized fluid 28 includes, for example, a superheated water heater 40, a water storage tank 42 and a fuel storage tank 44.

FIG. 5 shows one of a number of probes 32 and piston sealing devices 46 inserted within rocket nozzles 48 attached to back of rocket casings 50 on vehicle 26 to charge them with pressurized fluid, for example, steam or super-heated water. FIG. 5 shows sealing pistons 46 inserted within a cylindrical portion 52 of rocket nozzle 48 with piston rings 54 substantially sealing the space between piston 46 and cylindrical nozzle portion 52 to prevent too much pressure from leaking out of the filling connection to nozzle casing 50 while it is being pressurized. A pair of forward supports 62 and an aft support 63 are provided on vehicle 26 for holding flying device 12 at a takeoff angle as vehicle 26 carries it down track 14 for launching it. FIG. 2 shows flying device 12 on supports 62 and 63 from which it is launched when the motion of the vehicle 26 is terminated by arresting device 20.

Launching apparatus 10 contains a minimum of moving parts; has no critical, expensive or expendable parts; and requires very little in the way of periodic or operational maintenance. Cost per launch is minimal (mainly the cost of heating water at well under $100 per launch). Each water rocket requires approximately 66 gallons of water per RPV (remotely piloted vehicle) launch. Four rockets, for example, are used. A launch requires 264 gallons. One 1000-gallon storage tank should be adequate for each track site. A water pump with 1000 psi output supplies water to the water heater.

The water is heated to 550° F prior to launch. At this temperature the pressure is 800 psi. It is operatively effective to provide a first launch within 1 hour, and following launches within 30 minutes. The latter specification establishes power requirements because all the energy in the water is expended at each launch. The power required for electric heat is calculated to be around 1000 KW. The choice between electricity or other fuel is not critical because the requirement is so low. Either natural gas or fuel oil can be used. The water can also be heated directly within the rocket cases as shown in FIG. 6. One method would be to use resistance-type immersion heaters mounted on probe 32A. These would pass through the nozzle (48A not shown) and are self-supporting within the water-filled rocket case. FIG. 6 shows a modified loading probe 32A which incorporates an electrical heating element 64A for superheating the water within the rocket casing (not shown) thus avoiding the need for an external hot water heater. Another method would be to inject a conductor probe perhaps 3 feet inside the case. Current passes from the probe through the water to a case ground plate. The current flow through the water heats much like the immersion heaters.

Hot water distribution system 34 is presented in FIG. 2. The valves 35 to each rocket in the battery position are remotely controlled. Water can be fed to the rockets simultaneously or independently. The valves are, for example, of three-position type so that the rockets can be exhausted within five minutes without leaving the battery position, if desired. An auxiliary pump and pipeline can bypass the water heater and uses ambient temperature water to pressure test the rocket cases periodically above the 800 psi working level. Water for test can be returned to the water storage tank.

The RPV carrier 26, FIG. 2 and 3, includes a vehicle or sled 26, rockets 50, RPV interface components or supports 62 and 63 and sled holdback or latch 36.

Vehicle or sled 26 is 10 feet wide by 10 feet long, mounted on four F-104 nosewheel tires rated at 275 knots. Estimated weights are listed below:

| | | |
|---|---|---|
| a. Sled frame | | 1000 lbs. |
| b. Four rocket cases | | 2000 lbs. |
| c. Water | | 2400 lbs. |
| d. RPV (Max.) | | 3000 lbs. |
| | Total | 8400 lbs. |

After launch, the weight to be arrested is 3000 pounds.

Sled 26 has a grooved bumper 27 for engaging the arresting gear 20. Attached to the under frame of sled 26 are a pair of C-shaped shoes 15 that engaged the upper flange of guide track 14 to steer the sled as well as resisting the lift of the RPV and posible side loads from wind.

The sled rockets 50 are, for example, simple pressure tanks of less than 24-inch diameter, approximately 8 feet long, and weighing less than 500 pounds (empty). A single aft center-line nozzle 48 and suitable side anchor points complete each rocket assembly. The sled 26 is held back against the water distribution force at battery on starting end 16 of the track 14 to charge the rocket cases. Each rocket is filled with 600 pounds of water at 550° F and 800 psi. This stores enough energy to generate 25,000 pounds-seconds of impulse. See the thrust-time graph, FIG. 7. Scales can be used to weigh the carriage prior to launch. Velocity can be predicted from the known weight and temperature of the water and entire system weight prior to launch.

Interface or support assembly 62 and 63 in FIG. 3 requires very careful consideration. The system is programmed so that launch conditions are met at a predetermined station (600 ft.). Release of RPV can be mechanical and automatic at this point. Single guide track 14 is provided. This is a structural steel beam that is carefully aligned to steer the sled and resist RPV lift forces and possible side loads from wind. The arresting system 20 decelerates the sled (then weighing only 3000 pounds) to a stop in 200 feet. There are no apparently serious obstacles to preclude stopping of the sled at a high deceleration since the sled can be a simple structure that is not sensitive to g forces. The engaging velocity is also not a problem.

The required controls other than for normal RPV launch are listed below:
a. Water level in storage tank
b. Pump controls for filling water heater
c. Water temperature & pressure in heater
d. Valve controls for filling or pumping
e. Dolly weight indicator
f. Dolly holdback and release The four rockets are each filled with 600 pounds of hot water at 550° F — 800 psi. The sled is held back at battery position. After normal RPV engine start and development of full thrust, the holdback 36 is released. As the fill system plug 46 is exposed, the thrust increases rapidly to a force of 35,600 pounds on the 8,400 pound carriage assembly. A relatively constant acceleration force exists over the 600-foot stroke. As pressure and thrust decay, so does the mass of the sled because of the reduction in the weight of the water due to mass flow through the nozzles. Assuming conservatively that the engine thrust equals the aerodynamic drag, velocity of 400 feet/second (235 knots) is reached in 600 feet.

In the launch sequence, the RPV carrier is filled at battery position with hot water. Water mass and temperature are measured along with total weight of the sled with rockets and RPV. It is then verified that the desired launch conditions will be reached considering wind and all other factors. The holdback 36 is released, the system accelerates along the track, and the RPV lifts off at a predetermined track position. The sled 26 now weighing 3000 pounds, engages the arresting gear 20, and stops in 200 feet. Residual arresting gear energy returns the sled part way back to the battery end. The sled can be returned to battery position by hand or a small cub tractor can be used.

I claim:

1. A rocket-powered launching apparatus for a flying device comprising a guide track having starting and terminal ends, a rocket-powered vehicle operatively engaged with the guide track, at least one rocket casing on the rocket-powered vehicle, an exhaust nozzle in the rear of the rocket casing, an arresting device disposed at the terminal end of the guide track for terminating the movement of the rocket-powered vehicle, a source of pressurized fluid at the starting end of the guide track, a latching device at the starting end of the guide track for preliminarily restraining movement of the rocket-powered vehicle, pressurized fluid loading probe means on the source of pressurized fluid for loading the pressurized fluid into the rocket casing through the nozzle while the rocket-powered vehicle is maintained latched to the starting end of the track, sealing means between the pressurized fluid probe means and nozzle whereby the generation of pressure in the casing is facilitated, and release means on the latching means for releasing the rocket-powered vehicle and allowing it to move down the guide track toward the terminal end for launching a flying device connected to it.

2. A rocket-powered launching apparatus as set forth in claim 1 wherein a number of rocket casings are mounted on a vehicle and a fluid loading probe means is provided for each rocket casing.

3. A rocket-powered launching apparatus as set for in claim 1 wherein the source of pressurized fluid is a source of superheated water whereby steam pressure is generated within the rocket casing.

4. A rocket-powered launching apparatus as set forth in claim 1 wherein the latching means comprises a remotely-controlled holdback means.

5. A rocket-powered launching apparatus as set forth in claim 1 wherein the pressurized fluid loading probe means comprises an elongated probe for insertion through the nozzle into the rocket casing.

6. A rocket-powered launching apparatus as set forth in claim 5 wherein the pressurized fluid loading probe means comprises a plug, an elongated probe tube extends from the plug and the sealing means is mounted on the plug for engagement within the nozzle.

7. A rocket-powered launching apparatus as set forth in claim 6 wherein the plug comprises a piston and the sealing means comprises piston rings on the piston for engagement within the nozzle.

* * * * *